(12) United States Patent
Wang et al.

(10) Patent No.: US 11,012,886 B2
(45) Date of Patent: May 18, 2021

(54) DATA TRANSMISSION METHOD, TERMINAL DEVICE, AND NETWORK DEVICE

(71) Applicant: HUAWEI TECHNOLOGIES CO., LTD., Guangdong (CN)

(72) Inventors: Hejun Wang, Shenzhen (CN); Mingchao Li, Beijing (CN); Zhenzhen Cao, Beijing (CN); Hang Liu, Beijing (CN); Yinghui Yu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 22 days.

(21) Appl. No.: 16/698,736

(22) Filed: Nov. 27, 2019

(65) Prior Publication Data
US 2020/0107218 A1    Apr. 2, 2020

Related U.S. Application Data

(63) Continuation of application No. PCT/CN2018/088623, filed on May 28, 2018.

(30) Foreign Application Priority Data

Jun. 1, 2017 (CN) .......................... 201710406119.2

(51) Int. Cl.
*H04W 28/02* (2009.01)
*H04W 4/40* (2018.01)
(Continued)

(52) U.S. Cl.
CPC ......... *H04W 28/0268* (2013.01); *H04W 4/40* (2018.02); *H04W 80/02* (2013.01); *H04W 92/18* (2013.01)

(58) Field of Classification Search
CPC ... H04W 28/0268; H04W 4/40; H04W 80/02; H04W 92/18; H04W 36/06; H04W 36/08;
(Continued)

(56) References Cited

U.S. PATENT DOCUMENTS

2015/0215953 A1    7/2015 Wang et al.
2018/0359187 A1   12/2018 Bai
2019/0132770 A1*   5/2019 Hong .................... H04W 76/12

FOREIGN PATENT DOCUMENTS

CN          101132327 A      2/2008
CN          101964996 A      2/2011
(Continued)

OTHER PUBLICATIONS

Alliance, NGMN. "NGMN 5G Pre-Commercial Networks Trials." (2018). (Year: 2018).*
(Continued)

*Primary Examiner* — Sharad Rampuria
(74) *Attorney, Agent, or Firm* — Fish & Richardson P.C.

(57) ABSTRACT

Example data transmission methods and apparatus are described. One example method includes obtaining first configuration information by a terminal device. The first configuration information includes at least one first bearer identifier and path configuration information corresponding to the first bearer identifier, and the path configuration information corresponding to the first bearer identifier includes at least one of a sidelink transmission path or a network device forwarding transmission path. The terminal device obtains first service data and a second bearer identifier corresponding to the first service data, and selects a transmission path for the first service data based on the first bearer identifier, the second bearer identifier, and the path configuration information. The terminal device transmits the first service data on the transmission path.

18 Claims, 8 Drawing Sheets

(51) Int. Cl.
*H04W 80/02* (2009.01)
*H04W 92/18* (2009.01)

(58) Field of Classification Search
CPC ..... H04W 36/14; H04W 36/16; H04W 36/18;
H04W 36/165; H04L 47/10; H04L 47/12;
H04L 47/20; H04L 47/24; H04L 47/32;
H04L 47/38; H04L 47/70; H04L 47/72;
H04L 47/74; H04L 47/78; H04L 47/80
See application file for complete search history.

(56) References Cited

FOREIGN PATENT DOCUMENTS

| CN | 103634914 A | 3/2014 |
|---|---|---|
| CN | 104244294 A | 12/2014 |
| CN | 104796948 A | 7/2015 |
| CN | 104936247 A | 9/2015 |
| CN | 105337893 A | 2/2016 |
| CN | 105681445 A | 6/2016 |
| CN | 106134247 A | 11/2016 |
| CN | 106376047 A | 2/2017 |
| CN | 106559732 A | 4/2017 |
| EP | 3032787 A1 | 6/2016 |
| EP | 3122119 A1 | 1/2017 |
| WO | 2015163639 A1 | 10/2015 |

OTHER PUBLICATIONS

Office Action issued in Chinese Application No. 201710406119.2 dated Nov. 27, 2019, 17 pages (With English Translation).
PCT International Search Report and Written Opinion in International Application No. PCT/CN2018/088,623, dated Aug. 10, 2018, 16 pages (With English Translation).
Extended European Search Report issued in European Application No. 18809116.9 dated Apr. 23, 2020.
Huawei, HiSilicon, "Configuration of PC5 and/or Uu for V2V transport," 3GPP TSG-RAN WG2 Meeting #93bis, R2-162289; Dubrovnik, Croatia, Apr. 11-15, 2016, total 5 pages.
Office Action issued in Chinese Application No. 201710406119.2 dated May 13, 2020, 16 pages (with English translation).

* cited by examiner

DATA TRANSMISSION METHOD, TERMINAL DEVICE, AND NETWORK DEVICE

CROSS-REFERENCE TO RELATED APPLICATIONS

This application is a continuation of international Application No. PCT/CN2018/088623, filed on May 28, 2018, which claims priority to Chinese Patent Application No. 201710406119.2, filed on Jun. 1, 2017. The disclosures of the aforementioned applications are hereby incorporated by reference in their entireties.

TECHNICAL FIELD

This application relates to the communications field, and more specifically, to a data transmission method, a terminal device, and a network device.

BACKGROUND

As the society continuously develops, vehicles are becoming more popular. Driving facilitates people's travel, but also causes some adverse impact on the human society. A rapid increase in a quantity of vehicles causes a series of problems such as urban traffic congestion, frequent traffic accidents, and poor environmental quality. Therefore, a comprehensive intelligent transportation system (Intelligent Transportation System, ITS) is required in terms of personal safety, transport efficiency, environment protection, economic effects, and the like.

Currently, a vehicle may obtain road condition information or receive an information service in a timely manner by using vehicle to vehicle communication (Vehicle to Vehicle, V2V), vehicle to infrastructure communication (Vehicle to Infrastructure, V2I), vehicle to pedestrian communication (Vehicle to Pedestrian, V2P), or vehicle to network communication (Vehicle to Network, V2N). These communication manners may be collectively referred to as "V2X communication", and X represents everything. In addition, communication between vehicles may be implemented through forwarding by a network device.

Currently, main air interface transmission technologies in technologies related to the V2X communication include direct transmission communication and network forwarding transmission communication. The former refers to direct communication between mobile terminals, and service data is not forwarded by a network device such as a base station. Currently, a direct transmission communications technology mainly refers to a PC5 air interface. The latter refers to that a mobile terminal communicates with a mobile terminal through forwarding by a network device such as a base station. A current network device forwarding communications technology mainly refers to a Uu air interface. Common data transmission paths include a combination of the PC5 air interface and the Uu air interface, to be specific, a sidelink transmission path (communication through the PC5 air interface), a network device forwarding transmission path (communication through the Uu air interface), a sidelink transmission path and a network device forwarding transmission path, or a sidelink transmission path or a network device forwarding transmission path.

In the prior art, path selection is determined by an application layer, and a working mechanism of the direct communication is different from that of the network device forwarding transmission path. As a result, when a mobile terminal performs path reselection or switching in a communication process, a relatively large potential latency and service interruption are inevitably introduced.

SUMMARY

This application provides a data transmission method, a terminal device, and a network device, to reduce a potential switching latency and improve reliability during switching or reselection of a transmission path.

According to a first aspect, a data transmission method is provided. The method includes:

obtaining, by a terminal device, first configuration information, where the first configuration information includes at least one first bearer identifier and path configuration information corresponding to the first bearer identifier, and the path configuration information corresponding to the first bearer identifier includes at least one of a sidelink transmission path and a network device forwarding transmission path; obtaining, by the terminal device, first service data and a second bearer identifier corresponding to the first service data; selecting, by the terminal device, a transmission path for the first service data based on the first bearer identifier, the second bearer identifier, and the path configuration information; and transmitting, by the terminal device, the first service data on the transmission path.

The terminal device obtains the first service data and the second bearer identifier corresponding to the first service data, and obtains the first configuration information. The first configuration information includes at least the first bearer identifier and the path configuration information corresponding to the first bearer identifier, and the path configuration information includes at least one of the sidelink transmission path and the network device forwarding transmission path. In addition, the terminal device selects the transmission path for the first service data based on the first configuration information and the second bearer identifier, and further transmits the first service data on the selected transmission path. In this case, the terminal device may select a proper transmission path for the first service data based on an established transmission path, to avoid that a transmission path is established only when needed, thereby effectively reducing a potential latency and improving reliability, and also avoiding service interruption.

In some possible implementations, the terminal device determines the first configuration information at a non-access stratum.

The terminal device may be responsible for determining, at the non-access stratum (Non-Access Stratum, NAS), first configuration information of a correspondence between a service type and a quality of service flow (Quality of Service flow, QoS flow), to avoid that a network device determines the first configuration information and sends the first configuration information to the terminal device, thereby reducing power consumption of the network device.

In some possible implementations, the selecting, by the terminal device, a transmission path for the first service data based on the first bearer identifier, the second bearer identifier, and the path configuration information includes: selecting, by the terminal device at a first protocol layer, the transmission path for the first service data based on the first bearer identifier, the second bearer identifier, and the path configuration information.

The terminal device may select the transmission path at the first protocol layer, so that selection of the transmission path can adapt to an original protocol stack.

In some possible implementations, the first protocol layer of the terminal device is located above a packet data convergence protocol PDCP layer.

The first protocol layer may be a service data adaptation protocol (Service Data Adaptation Protocol, SDAP) layer in an access stratum of the protocol stack, so that path selection is transparent to an application layer.

In some possible implementations, the first bearer identifier is at least one of a flow identifier, a sidelink bearer identifier, an E-RAB identifier, or a service type identifier; and the second bearer identifier is at least one of a flow identifier, a sidelink bearer identifier, an E-RAB identifier, or a service type identifier.

The first bearer identifier and the second bearer identifier may be the same, or may have a correspondence or a mapping relationship. The first bearer identifier and the second bearer identifier may both be at least one of the flow identifier, the sidelink bearer identifier, the E-RAB identifier, or the service type identifier, so that the terminal device can select a more accurate transmission path for the first service data based on the first bearer identifier, the second bearer identifier, and the path configuration information, thereby improving efficiency of transmitting the first service data.

In some possible implementations, the selecting, by the terminal device, a transmission path for the first service data based on the first bearer identifier, the second bearer identifier, and the path configuration information includes: when the second bearer identifier is the first bearer identifier, selecting, by the terminal device, the transmission path for the first service data based on the path configuration information.

When the second bearer identifier is the same as a first bearer identifier, or the second bearer identifier corresponds to a first bearer identifier, the transmission path is selected based on path configuration information corresponding to the first bearer identifier. In other words, the terminal device can select, based on the first bearer identifier included in the first configuration information, the transmission path for the first service data corresponding to the second bearer identifier, thereby improving efficiency of path selection.

In some possible implementations, the path configuration information includes at least one of first indication information, second indication information, third indication information, or fourth indication information, where the first indication information is used to indicate that the transmission path is a sidelink transmission path, the second indication information is used to indicate that the transmission path is a network device forwarding transmission path, the third indication information is used to indicate that the transmission path is a sidelink transmission path and a network device forwarding transmission path, and the fourth indication information is used to indicate that the transmission path is a sidelink transmission path or a network device forwarding transmission path.

The path configuration information may include at least one of the first indication information, the second indication information, the third indication information, and the fourth indication information, so that the terminal device may select the transmission path based on the indication information in the path configuration information corresponding to the first bearer identifier. This reduces memory occupation compared with a case in which the path configuration information includes the transmission path.

In some possible implementations, the selecting, by the terminal device, a transmission path for the first service data based on the first bearer identifier, the second bearer identifier, and the path configuration information includes at least one of the following manners: when the second bearer identifier is the first bearer identifier and the path configuration information includes the first indication information, selecting, by the terminal device, the sidelink transmission path as the transmission path; when the second bearer identifier is the first bearer identifier and the path configuration information includes the second indication information, selecting, by the terminal device, the network device forwarding transmission path as the transmission path; when the second bearer identifier is the first bearer identifier and the path configuration information includes the third indication information, selecting, by the terminal device, the sidelink transmission path and the network device forwarding transmission path as the transmission path; and when the second bearer identifier is the first bearer identifier and the path configuration information includes the fourth indication information, selecting, by the terminal device, the sidelink transmission path or the network device forwarding transmission path as the transmission path.

The terminal device can select, based on the first bearer identifier and the indication information that are included in the first configuration information, a proper transmission path for the first service data corresponding to the second bearer identifier, thereby improving efficiency of path selection while reducing memory occupation.

In some possible implementations, the path configuration information includes at least one of fifth indication information or sixth indication information, where the fifth indication information is any one of a sidelink bearer identifier, a service type identifier, a service identifier, or a first logical channel identifier, and the sixth indication information is a data radio bearer identifier or a second logical channel identifier; and the selecting, by the terminal device, a transmission path for the first service data based on the first bearer identifier, the second bearer identifier, and the path configuration information includes at least one of the following manners: when the second bearer identifier is the first bearer identifier and the path configuration information includes the fifth indication information, selecting, by the terminal device, a corresponding sidelink transmission path as the transmission path based on the fifth indication information; and when the second bearer identifier is the first bearer identifier and the path configuration information includes the sixth indication information selecting, by the terminal device, a corresponding network device forwarding transmission path as the transmission path based on the sixth indication information.

The path configuration information includes the fifth indication information or the sixth indication information, the fifth indication information is used to indicate a more specific sidelink transmission path, and the sixth indication information is used to indicate a more specific network device forwarding transmission path. In this case, the terminal device can determine a more proper sidelink transmission path based on the first bearer identifier, the second bearer identifier, and the fifth indication information, or the terminal device can determine a more proper network device forwarding transmission path based on the first bearer identifier, the second bearer identifier, and the sixth indication information, thereby further improving efficiency of transmitting service data. In some possible implementations, when the transmission path includes the sidelink transmission path, before the selecting, by the terminal device, a transmission path for the first service data based on the first bearer identifier, the second bearer identifier, and the path configuration information, the method further includes: obtaining, by the terminal device, first parameter information, where the first parameter information includes at least one of a first source identifier, a first destination identifier, or first priority information; and the transmitting, by the terminal device, the first service data on the transmission path includes: generating, by the terminal device, a first media access control MAC protocol data unit based on the first parameter information and the first service data, where the first service data and the first parameter information are encapsulated in the first MAC protocol data unit; and sending, by the terminal device, the first MAC protocol data unit on the transmission path.

When the terminal device performs direct communication with another terminal device, the terminal device may generate a MAC protocol data unit based on service data and parameter information including at least one of a source identifier, a destination identifier, or priority information, and further send, on the transmission path, the MAC protocol data unit in which the first service data and the first parameter information are encapsulated.

In some possible implementations, before the selecting, by the terminal device, a transmission path for the first service data based on the first bearer identifier, the second bearer identifier, and the path configuration information, the method further includes: obtaining, by the terminal device, second configuration information, where the second configuration information includes the second bearer identifier and second parameter information, and the second parameter information includes at least one of a second source identifier, a second destination identifier, or second priority information; and the transmitting, by the terminal device, the first service data on the transmission path includes: when the second bearer identifier is the first bearer identifier, generating, by the terminal device, a second MAC protocol data unit based on the second parameter information and the first service data, where the first service data and the second parameter information are encapsulated in the second MAC protocol data unit; and sending, by the terminal device, the second MAC protocol data unit on the transmission path.

The terminal device may generate the second MAC protocol data unit based on the second parameter information and the first service data, and sends the second MAC protocol data unit on the selected transmission path.

In some possible implementations, the second parameter information may be in same configuration information (to be specific, the second configuration information) as the second bearer identifier.

In some possible implementations, before the selecting, by the terminal device, a transmission path for the first service data based on the first bearer identifier, the second bearer identifier, and the path configuration information, the method further includes: obtaining, by the terminal device, second configuration information, where the second configuration information includes a mapping relationship between the first bearer identifier and second parameter information, and the second parameter information includes at least one of a second destination identifier or second priority information; and the transmitting, by the terminal device, the first service data on the transmission path includes: when the second bearer identifier is the first bearer identifier, generating, by the terminal device, a second MAC protocol data unit based on a second source identifier, the second bearer identifier, and the first service data, and the first service data and the second parameter information are encapsulated in the second MAC protocol data unit; and sending, by the terminal device, the second MAC protocol data unit on the transmission path. The terminal device may generate the second MAC protocol data unit based on the second parameter information and the first service data, and sends the second MAC protocol data unit on the selected transmission path.

The terminal device and the network device may preset a mapping relationship between the second bearer identifier and a destination identifier destination ID and priority information PPPP. To be specific, the destination ID and the PPPP may be separately determined based on the second bearer identifier. In this case, the terminal device may only obtain a source ID, determine the destination ID and the PPPP based on the second bearer identifier, and then generate a MAC protocol data unit. In this case, the terminal device may not specially obtain the destination ID and the PPPP, thereby reducing system power consumption.

In some possible implementations, the terminal device may receive the source ID sent by the application layer, or generate the source ID at the first protocol layer. To be specific, the terminal device may flexibly obtain the source ID to meet its own requirement, thereby reducing a switching latency of the transmission path.

In some possible implementations, the transmitting, by the terminal device, the first service data on the transmission path includes: generating, by the terminal device, a third MAC protocol data unit based on the second bearer identifier and the first service data, where the second bearer identifier and the first service data are encapsulated in the third MAC protocol data unit; and sending, by the terminal device, the third MAC protocol data unit on the transmission path.

The second bearer identifier may have a mapping relationship with at least one of the source identifier, the destination identifier, or the second priority information. In this case, the terminal device may learn of, based on the second bearer identifier, parameter information (to be specific, at least one of the source identifier, the destination identifier, or the second priority information) required to generate the third MAC protocol data unit, to generate the third MAC protocol data unit. Therefore, the terminal device may not specially obtain the at least one of the source identifier, the destination identifier, or the second priority information, thereby reducing system power consumption.

In some possible implementations, the obtaining, by a terminal device, first configuration information includes: obtaining, by the terminal device, preconfiguration information, where the preconfiguration information includes the first configuration information; or receiving, by the terminal device, a system message sent by the network device, where the system message carries the first configuration information; or receiving, by the terminal device, dedicated radio resource control signaling sent by the network device, where the dedicated radio resource control signaling carries the first configuration information.

In this case, the terminal device does not need to receive the first configuration information specially sent by the network device, but the first configuration information is carried in the system message or the dedicated radio resource control signaling, thereby reducing system power consumption. Alternatively, the terminal device may obtain the preconfiguration information, to avoid that the first configuration information is obtained only when needed, thereby reducing a latency of path selection.

According to a second aspect, a data transmission method is provided. The method includes: determining, by a network device, first configuration information, where the first configuration information includes at least one first bearer identifier and path configuration information corresponding to the first bearer identifier, and the path configuration information corresponding to the first bearer identifier includes at least one of a sidelink transmission path and a network device forwarding transmission path; and sending, by the network device, the first configuration information to a terminal device, where the first configuration information is a reference element used by the terminal device to select a transmission path for first service data.

The network device determines the first configuration information. The first configuration information includes at least the first bearer identifier and the path configuration information corresponding to the first bearer identifier, and the path configuration information includes at least one of the sidelink transmission path and the network device forwarding transmission path. In addition, the network device sends the first configuration information to the terminal device, so that the terminal device selects the transmission path for the first service data based on the first configuration information and a second bearer identifier corresponding to the first service data, and further transmits the first service data on the selected transmission path. In this case, the terminal device may select a proper transmission path for the first service data based on an established transmission path, to avoid that a transmission path is established only when needed, thereby effectively reducing a potential latency and improving reliability, and also avoiding service interruption.

In some possible implementations, the determining, by a network device, first configuration information includes: determining, by the network device, the first configuration information at a non-access stratum.

The network device may determine the first configuration information at the non-access stratum, and sends the first configuration information to the terminal device, so that the terminal device can select a proper transmission path, to avoid that a transmission path is established only when needed, thereby effectively reducing a potential latency and improving reliability.

In some possible implementations, the first bearer identifier is at least one of a flow identifier, a sidelink bearer identifier, an evolved radio access bearer E-RAB identifier, or a service type identifier.

The first bearer identifier and the second bearer identifier may both be at least one of the flow identifier, the sidelink bearer identifier, the E-RAB identifier, or the service type identifier, and the network device sends the first configuration information including the first bearer identifier and the path configuration information corresponding to the first bearer identifier, so that the terminal device can select a more accurate transmission path for the first service data based on the first bearer identifier, the second bearer identifier, and the path configuration information, thereby improving efficiency of transmitting the first service data.

In some possible implementations, the path configuration information includes at least one of first indication information, second indication information, third indication information, or fourth indication information, where the first indication information is used to indicate that the transmission path is a sidelink transmission path, the second indication information is used to indicate that the transmission path is a network device forwarding transmission path, the third indication information is used to indicate that the transmission path is a sidelink transmission path and a network device forwarding transmission path, and the fourth indication information is used to indicate that the transmission path is a sidelink transmission path or a network device forwarding transmission path.

The path configuration information may include at least one of the first indication information, the second indication information, the third indication information, and the fourth indication information. In this case, after the network device sends the first configuration information to the terminal device, the terminal device may select the transmission path based on the indication information in the path configuration information corresponding to the first bearer identifier. This reduces memory occupation and power consumption for sending the first configuration information compared with a case in which the path configuration information includes the transmission path.

In some possible implementations, when the transmission path includes the network device forwarding transmission path, the method further includes: receiving, by the network device, the first service data.

If the transmission path selected by the terminal device for first service data includes the network device forwarding transmission path, the network device may receive the first service data in a timely manner.

In some possible implementations, the receiving, by the network device, the first service data includes: receiving, by the network device, a first media access control MAC protocol data unit, where the first MAC protocol data unit is generated by the terminal device based on first parameter information and the first service data, the first parameter information includes at least one of a first source identifier, a first destination identifier, or first priority information, and the first service data and the first parameter information are encapsulated in the first MAC protocol data unit.

If the transmission path selected by the terminal device is the network device forwarding transmission path, and the terminal device generates, based on the first parameter information and the first service data, the MAC protocol data unit in which the first service data and the first parameter information are encapsulated, the network device can also receive the MAC protocol data unit.

In some possible implementations, the method further includes: sending, by the network device, second configuration information, where the second configuration information includes the second bearer identifier and second parameter information, and the second parameter information includes at least one of a second source identifier, a second destination identifier, or second priority information; and the receiving, by the network device, the first service data includes: receiving, by the network device, a second MAC protocol data unit, where the second MAC protocol data unit is generated by the terminal device based on the second parameter information and the first service data, and the first service data and the second parameter information are encapsulated in the second MAC protocol data unit.

The network device may send the second configuration information including the second bearer identifier and the second parameter information to the terminal device, and the second parameter information includes at least one of the second source identifier, the second destination identifier, or the second priority information, so that the terminal device generates the second MAC protocol data unit based on the second parameter information and the first service data, and sends the second MAC protocol data unit.

In some possible implementations, the receiving, by the network device, the first service data includes: receiving, by the network device, a third MAC protocol data unit, where the third MAC protocol data unit is generated by the terminal device based on the second bearer identifier and the first service data, and the second bearer identifier and the first service data are encapsulated in the third MAC protocol data unit.

The second bearer identifier may have a mapping relationship with at least one of the source identifier, the destination identifier, or the second priority information. The network device receives the third MAC protocol data unit that is generated by the terminal device based on the first service data and the parameter information (to be specific, at least one of the source identifier, the destination identifier, or the second priority information) that is learned of based on the second bearer identifier. In this case, the network device may not specially send the at least one of the source identifier, the destination identifier, or the second priority information, thereby reducing power consumption of the network device.

In some possible implementations, the sending, by the network device, the first configuration information to a terminal device includes: sending, by the network device, preconfiguration information to the terminal device, where the preconfiguration information includes the first configuration information; or sending, by the network device, a system message to the terminal device, where the system message carries the first configuration information; or sending, by the network device, dedicated radio resource control signaling to the terminal device, where the dedicated radio resource control signaling carries the first configuration information.

The network device does not need to specially send the first configuration information, but the first configuration information is carried in the system message or the dedicated radio resource control signaling, thereby reducing system power consumption. Alternatively, the network device may send the preconfiguration information in advance, to avoid that the first configuration information is sent only when needed, thereby reducing a latency of path selection performed by the terminal device.

According to a third aspect, a terminal device is provided. The terminal device includes a module configured to perform the method according to the first aspect or any possible implementation of the first aspect.

According to a fourth aspect, a network device is provided. The network device includes a module configured to perform the method according to the second aspect or any possible implementation of the second aspect.

According to a fifth aspect, a system is provided. The system includes:

the terminal device according to the third aspect and the network device according to the fourth aspect.

According to a sixth aspect, a terminal device is provided. The terminal device includes a processor, a memory, and a communications interface. The processor is connected to the memory and the communications interface. The memory is configured to store an instruction, the processor is configured to execute the instruction, and the communications interface is configured to communicate with another network element under control of the processor. When the processor executes the instruction stored in the memory, the terminal device is enabled to perform the method according to the first aspect or any possible implementation of the first aspect.

According to a seventh aspect, a network device is provided. The network device includes a processor, a memory, and a communications interface. The processor is connected to the memory and the communications interface. The memory is configured to store an instruction, the processor is configured to execute the instruction, and the communications interface is configured to communicate with another network element under control of the processor. When the processor executes the instruction stored in the memory, the network device is enabled to perform the method according to the second aspect or any possible implementation of the second aspect.

According to an eighth aspect, a computer storage medium is provided. The computer storage medium stores program code, and the program code is used to instruct to execute an instruction for the method according to the first aspect or any possible implementation of the first aspect.

According to a ninth aspect, a computer storage medium is provided. The computer storage medium stores program code, and the program code is used to instruct to execute an instruction for the method according to the second aspect or any possible implementation of the second aspect.

Based on the foregoing technical solutions, the first service data and the second bearer identifier corresponding to the first service data are obtained, and the first configuration information is obtained. The first configuration information includes at least the first bearer identifier and the path configuration information corresponding to the first bearer identifier, and the path configuration information includes at least one of the sidelink transmission path and the network device forwarding transmission path. In addition, the transmission path is selected for the first service data based on the first configuration information and the second bearer identifier, and further the first service data is transmitted on the selected transmission path. In this case, the terminal device can select a proper transmission path for the first service data based on an established transmission path, to avoid that a transmission path is established only when needed, thereby effectively reducing a potential latency and improving reliability, and also avoiding unnecessary service interruption.

DESCRIPTION OF EMBODIMENTS

Figure 1:
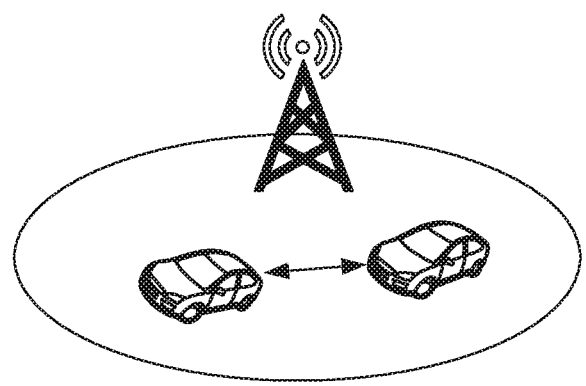
FIG. 1 is a schematic diagram of an application scenario of wireless communication.

The following describes technical solutions in this application with reference to the accompanying drawings.

The technical solutions in the embodiments of this application may be applied to various communications systems, for example, a global system for mobile communications (Global System for Mobile communications, GSM), a code division multiple access (Code Division Multiple Access, CDMA) system, a wideband code division multiple access (Wideband Code Division Multiple Access, WCDMA) system, a general packet radio service (General Packet Radio Service, GPRS) system, an LTE system, an LTE frequency division duplex (Frequency Division Duplex, FDD) system, an LTE time division duplex (Time Division Duplex, TDD) system, a universal mobile telecommunications system (Universal Mobile Telecommunications System, UMTS), a wireless cellular network system, and a new-generation wireless communications (new radio, NR) system. Only the LTE system and the NR system are used as examples for description in the embodiments of this application, but this application is not limited hereto.

It should be further understood that, in the embodiments of this application, a terminal device may be referred to as user equipment (User Equipment, UE), a terminal (Terminal), a mobile station (Mobile Station, MS), a mobile terminal (Mobile Terminal), or the like. The terminal device may further communicate with one or more core networks through a radio access network (Radio Access Network, RAN). The terminal device may alternatively be referred to as an access terminal, a subscriber unit, a subscriber station, a mobile station, a remote station, a remote terminal, a mobile device, a user terminal, a terminal, a wireless communications device, a user agent, or a user apparatus. The terminal device may alternatively be a cellular phone, a cordless phone, a session initiation protocol (Session Initiation Protocol, SIP) phone, a wireless local loop (Wireless Local Loop, WLL) station, a personal digital assistant (Personal Digital Assistant, PDA), a handheld device having a wireless communication function, a computing device, another processing device connected to a wireless modem, a vehicle-mounted device, a vehicle having a communication function, a wearable device, a terminal device in a future 5G network, or the like.

A network device in the embodiments of this application may be a device configured to communicate with the terminal device, and the network device may be a base transceiver station (Base Transceiver Station, BTS) in the global system for mobile communications (Global System for Mobile communications, GSM) or the code division multiple access (Code Division Multiple Access, CDMA) system, or may be a NodeB (NodeB, NB) in the wideband code division multiple access Wideband Code Division Multiple Access, WCDMA) system, or may be an evolved NodeB (Evolved NodeB, eNB or eNodeB) in the LTE system, or may be a radio controller in a cloud radio access network (Cloud Radio Access Network, CRAN) scenario, or may be a core network element. Alternatively, the network device may be a relay station, an access point, a vehicle-mounted device, a wearable device, a network device in the future 5G network, a device in a future evolved PLMN network, or the like. This is not limited in the embodiments of this application.

FIG. 1 shows an application scenario of wireless communication. A V2X technology is a communications technology applicable to ultra-reliable low-latency communication (URLLC, Ultra Reliable Low Latency Communication). A typical application scenario of the technology is V2X communication such as vehicle to vehicle communication (V2V) or vehicle to infrastructure communication (Vehicle to Infrastructure, V2I), and features of the V2X communication are that a distance between terminal devices communicating with each other is relatively short, a transmission latency is relatively low, but reliability is relatively low. An interface for direct communication between a vehicle and a surrounding terminal may be referred to as a "PC5 air interface".

Figure 2:
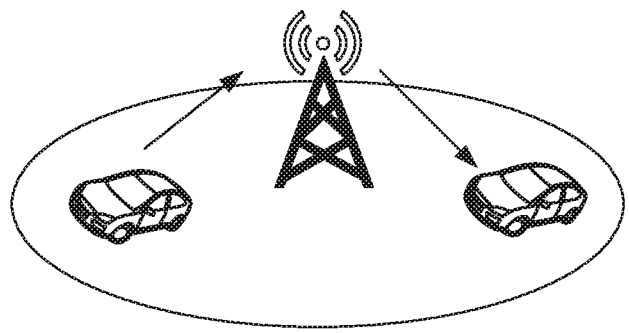
FIG. 2 is a schematic diagram of another application scenario of wireless communication.

FIG. 2 shows another application scenario of wireless communication. As shown in FIG. 2, when a building block exists between vehicles, or a vehicle has a requirement to propagate a message farther or has a relatively high requirement on data transmission reliability, a network device may be used to forward the message for the vehicle. To be specific, the vehicle transmits the message to the network device, and the network device forwards the message and then transmits the message to another vehicle, to implement Internet of Vehicles communication. An interface between the vehicle and the network device may be referred to as a "Uu air interface".

Figure 3:
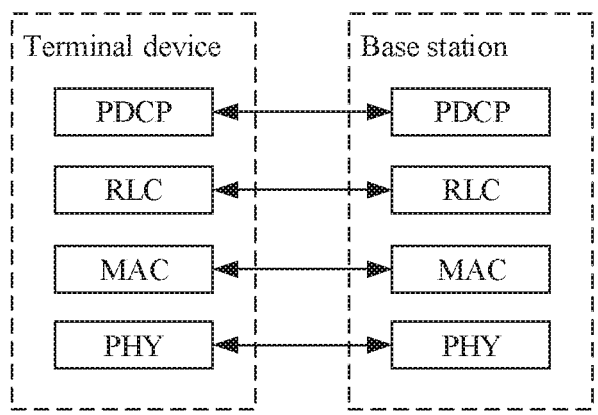
FIG. 3 is a schematic diagram of a user plane protocol stack of conventional long term evolution (Long Term Evolution, LTE)

FIG. 3 shows a schematic diagram of a user plane protocol stack of conventional LTE. As shown in FIG. 3, a terminal device and a base station each include a user plane protocol stack including a packet data convergence protocol (Packet Data Convergence Protocol, PDCP) layer, a radio link control (Radio Link Control, RLC) layer, a MAC layer, and a physical (Physical, PHY) layer. The PDCP layer is used to perform compression and decompression, encryption and decryption, and integrity verification on an Internet protocol (Internet Protocol, IP) header. The RLC layer is used to provide segmentation and retransmission services for user and control data, including functions such as packet segmentation, packet sequencing, duplicate packet detection, and packet reassembly. The MAC layer is mainly responsible for controlling and connecting to a physical medium at the physical layer. The PHY layer is used to create, maintain, and remove a physical link required for data transmission, and provide mechanical, electronic, functional, and standard features.

Figure 4:
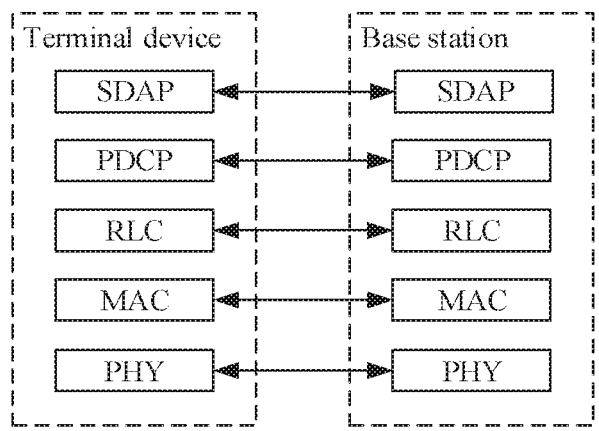
FIG. 4 is a schematic diagram of a user plane protocol stack of a new-generation wireless communications system (New Radio, NR)

FIG. 4 is a schematic diagram of a user plane protocol stack of NR. As shown in FIG. 4, both a terminal device and a base station include a service data adaptation protocol (Service Data Adaptation Protocol, SDAP) layer, a PDCP layer, an RLC layer, a MAC layer, and a PHY layer. The SDAP layer is located above the PDCP layer at an access stratum, and the PDCP layer is located between the SDAP layer and the RLC layer.

Figure 5:
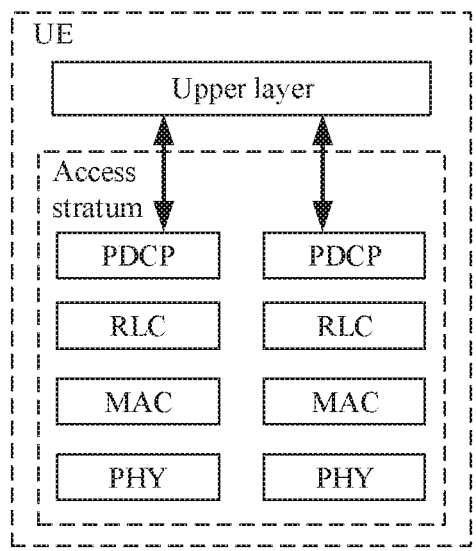
FIG. 5 is a schematic diagram of an internal protocol structure of a terminal device of conventional LTE.

FIG. 5 is a schematic diagram of an internal protocol structure of a terminal device of conventional LTE. As shown in FIG. 5, the internal protocol structure of the terminal device includes an upper layer (Upper Layer), a PDCP layer, an RLC layer, a MAC layer, and a PHY layer.

Figure 6:
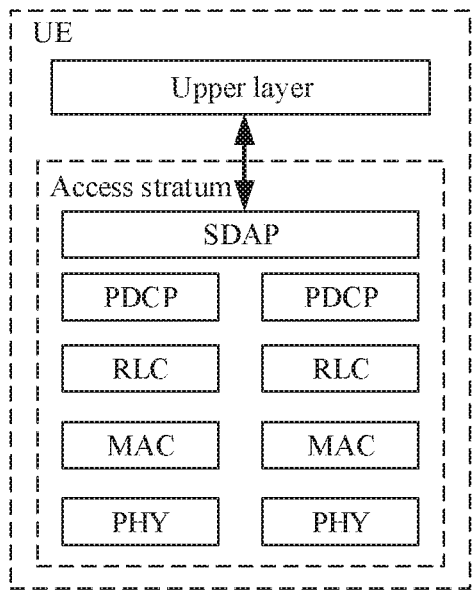
FIG. 6 is a schematic diagram of an internal protocol structure of a terminal device according to an embodiment of this application.

FIG. 6 is a schematic diagram of an internal protocol structure of a terminal device according to an embodiment of this application. As shown in FIG. 6, the internal protocol structure of the terminal device includes an upper layer, an SDAP layer, a PDCP layer, an RLC layer, a MAC layer, and a PHY layer.

In a conventional solution, the terminal device determines, at an application layer, a transmission path of service data based on a requirement of a V2X service on quality of service such as a latency and reliability, and based on features of different transmission paths. On the transmission path of the service data, transmission may be performed through a Uu air interface or a PC5 air interface, through a Uu air interface and a PC5 air interface, through a Uu air interface, and through a PC5 air interface. When the application layer selects the Uu air interface to perform data transmission, the terminal device sends, at the application layer, packet header information of the service data to an access stratum based on an uplink traffic flow template (Uplink Traffic Flow Template, UL TFT), and establishes a data radio bearer (Data Radio Bearer, DRB) at the access stratum. When the application layer selects the PC5 air interface to perform data transmission, the terminal device sends, at the application layer, parameter information such as a source identifier (Source ID), a destination identifier (Destination ID), and priority information (PPPP, ProSe Per-Packet Priority) to the access stratum in a primitive manner, and establishes, at the access stratum based on the destination ID, a sidelink radio bearer (Sidelink Radio Bearer, SLRB) between the terminal device and another terminal device.

Therefore, the application layer of the terminal device performs path selection based on the requirement of V2X service data on the quality of service (Quality of Service, QoS), or needs to perform path switching or reselection on some services due to reasons such as load balancing. However, a running mechanism such as parameter transfer used when the service data is transmitted through the Uu air interface is different from that used when the service data is transmitted through the PC5 air interface. For example, when the terminal device is switched from transmitting the service data through the Uu air interface to transmitting the service data through the PC5 air interface, the parameter information such as the source ID, the destination ID, and the PPPP needs to be obtained again to establish an SLRB connection. In this case, a long potential latency or service interruption is introduced.

Figure 7:
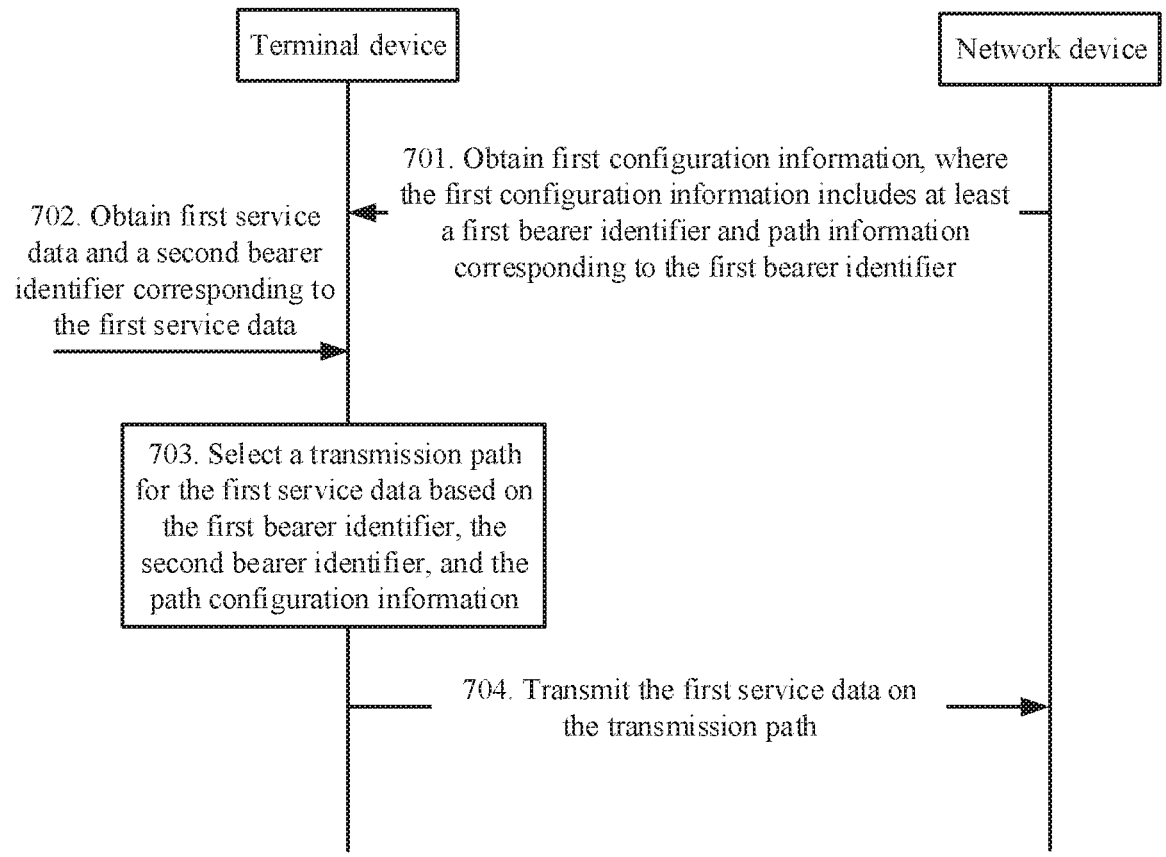
FIG. 7 is a schematic flowchart of a data transmission method according to an embodiment of this application.

FIG. 7 is a schematic flowchart of a data transmission method according to an embodiment of this application.

701. A terminal device obtains first configuration information, where the first configuration information includes at least one first bearer identifier and path configuration information corresponding to the first bearer identifier, and the path configuration information includes at least one of a sidelink transmission path and a network device forwarding transmission path. Correspondingly, a network device sends the first configuration information.

The first configuration information includes a preconfigured transmission path, and has a correspondence with the first bearer identifier. The first hearer identifier may be a type of bearer identifier included in the first configuration information, and each first bearer identifier included in the first configuration information has corresponding path configuration information. The path configuration information may specifically be the sidelink transmission path, the network device forwarding transmission path, the sidelink transmission path and the network device forwarding transmission path, or the sidelink transmission path or the network device forwarding transmission path.

On the sidelink transmission path shown in FIG. 1, terminal devices communicate with each other by using a "PC5 air interface". For example, in the European Internet of Vehicles standard, a vehicle periodically broadcasts its driving status to surrounding vehicles by using a cooperative awareness message (Cooperative Awareness Message, CAM). In a line-of-sight (Line of Sight, LOS) situation, the CAM message is broadcast through the PC5 air interface. The LOS situation refers to that a radio signal is transmitted between a transmit end and a receive end in a straight line without being blocked. Alternatively, in a vehicle platooning (vehicle platooning) scenario, when vehicles are relatively close to each other, driving operation-related information is directly transmitted to a neighboring vehicle through the PC5 air interface. The latency is relatively small, and reliability is relatively high. Vehicle platooning refers to that a head vehicle is driven by a driver, and vehicles behind the head vehicle are instructed by the head vehicle, and receive an operation instruction from the head vehicle, to accelerate or brake.

On the network device forwarding transmission path shown in FIG. 2, a terminal device transmits data to a network device through a "Uu air interface" between the terminal device and the network device, and then the network device forwards the data to another terminal device. For example, in a non-line-of-sight (Non Line of Sight, NLOS) scenario at a crossroad in an urban area, non-line-of-sight refers to that a radio signal is transmitted through a path that is partially blocked. Usually, obstacles that cause an NLOS situation include a building, a tree, a hill, a mountain, or a high-voltage electronic power line. In the NLOS scenario, a CAM message sent by the terminal device to a vehicle in another direction needs to be forwarded by the network device. Alternatively, in a vehicle platooning scenario, vehicle driving status information such as a vehicle speed has a low requirement on reliability, and therefore may be transmitted through the PC5 air interface. A message that has a high requirement on both a latency and reliability, such as a braking, may be transmitted through both the PC5 air interface and the Uu air interface. In the vehicle platooning scenario, for service data used for status maintenance of a vehicle platoon, for example, for determining a proper relay vehicle, the service data needs to be transmitted through the Uu air interface. However, in the vehicle platooning scenario, the CAM message may be transmitted through either the Uu air interface or the PC5 air interface.

Specifically, when the path configuration information is the sidelink transmission path or the network device forwarding transmission path, the terminal device may transmit the service data through the Uu air interface, or may transmit the service data through the PC5 air interface. When the path configuration information is the sidelink transmission path and the network device forwarding transmission path, the terminal device transmits the service data through both the Uu air interface and the PC5 air interface. When the path configuration information is the network device forwarding transmission path, the terminal device may transmit the service data only through the Uu air interface. When the path configuration information is the sidelink transmission path, the terminal device may transmit the service data only through the PC5 air interface.

Optionally, the first bearer identifier may be a field in the configuration information, may be a flow identifier, a sidelink bearer identifier, or a data radio bearer identifier, may be a quality of service flow (QoSflow) identifier of the service data, may be a service type identifier used to distinguish a type of the service data, or an evolved radio access bearer (Evolved Radio Access Bearer, E-RAB) identifier, or may be at least one of the foregoing. This is not limited in this application.

For example, the first bearer identifier may be the flow identifier and the QoSflow identifier. To be specific, the flow identifier and the QoSflow identifier may have a correspondence, and the first bearer identifier corresponds to a type of path configuration information. Alternatively, the first bearer identifier may be the flow identifier, the QoSflow identifier, and the service type identifier. To be specific, the flow identifier, the QoSflow identifier, and the service type identifier have a correspondence, and the first bearer identifier corresponds to a type of path configuration information. Alternatively, the first bearer identifier may be any combination of the foregoing. This is not limited in this application.

Optionally, the first configuration information may be indication information. To be specific, the terminal device may determine content of the first configuration information based on the indication information. Alternatively, the first configuration information directly includes corresponding content, and the terminal device can directly learn of the content of the first configuration information based on the first configuration information.

Optionally, the path configuration information may directly include at least one of the foregoing four types of transmission paths, or may include at least one piece of indication information. Specifically, the path configuration information includes at least one of first indication information, second indication information, third indication information, and fourth indication information. The first indication information is used to indicate that the transmission path is a sidelink transmission path, the second indication information is used to indicate that the transmission path is a network device forwarding transmission path, the third indication information is used to indicate that the transmission path is a sidelink transmission path and a network device forwarding transmission path, and the fourth indication information is used to indicate that the transmission path is a sidelink transmission path or a network device forwarding transmission path. For example, if the path configuration information includes the first indication information and the second indication information, to be specific, the first bearer identifier may correspond to two types of transmission paths: the sidelink transmission path and the network device forwarding transmission path, the terminal device may select, from the two types of transmission paths based on the first bearer identifier, a proper transmission path to transmit the service data.

For another example, if the configuration information includes the first indication information, the second indication information, and the third indication information, to be specific, the first bearer identifier may correspond to three types of transmission paths: the sidelink transmission path, the network device forwarding transmission path, and the sidelink transmission path and the network device forwarding transmission path, the terminal device may select, from the three types of transmission paths based on the first bearer identifier, a proper transmission path to transmit the service data.

Optionally, the network device may separately send the first configuration information to the terminal device.

Optionally, the first configuration information sent by the network device to the terminal device may be carried in a system message or dedicated radio resource control signaling.

Optionally, the first configuration information may alternatively be agreed upon by the network device and the terminal device in advance. In other words, the terminal device does not need to obtain the first configuration information from the network device. Alternatively, the first configuration information may be preconfigured by the network device. This is not limited in this application.

Figure 8:
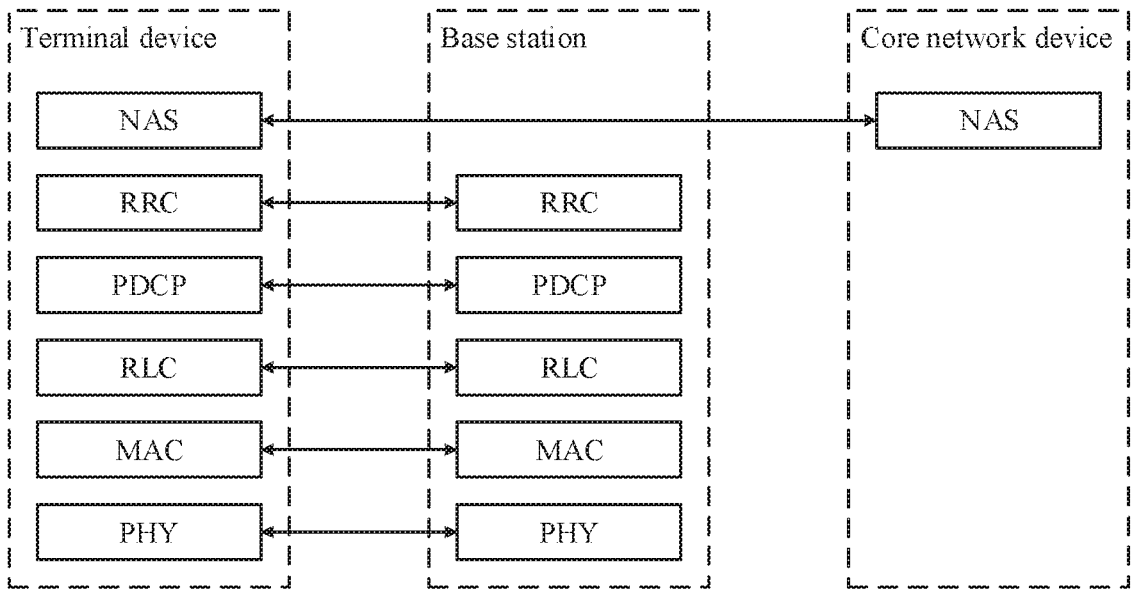
FIG. 8 is a schematic diagram of a control plane protocol stack of NR according to this application.

FIG. 8 is a schematic diagram of a control plane protocol stack of NR. As shown in FIG. 8, the control plane protocol stack of the NR is related to a terminal device, a base station, a core network device, and the like. Specifically, the terminal device and the core network device may include a non-access stratum (Non-Access Stratum, NAS). Specifically, the NAS on a terminal device side is responsible for determining first configuration information of a correspondence between a service type and a QoSFlow. The first configuration information may be stored by a core network element and is configured for the terminal device. Alternatively, the first configuration information may take effect on the terminal device side in a preconfiguration manner. When the terminal device needs to send service data, the NAS maps the service data to a corresponding QoSFlow based on first configuration information of a V2X service and a QoSFlow.

It should be understood that the first configuration information may be configured for the terminal device by using broadcast, dedicated signaling, or preconfiguration.

It should be further understood that the network device in this embodiment of this application may be the base station or the core network device shown in FIG. 8. This is not limited in this application.

702. The terminal device obtains first service data and a second bearer identifier corresponding to the first service data.

The terminal device may obtain service data and a second bearer identifier corresponding to the service data by receiving data from an upper layer. The second bearer identifier may be a field in configuration information, may be indication information used to indicate the service data, may be a flow identifier, may be a sidelink bearer identifier, may be a quality of service flow (QoSflow) identifier of the service data, may be an identifier used to distinguish a type of the service data, or an E-RAB identifier, or may be any combination of the foregoing. This is not limited in this application.

It should be understood that when the first bearer identifier is a combination of at least one of the flow identifier, the sidelink bearer identifier, the quality of service flow (QoSflow) identifier, the service type identifier, or the E-RAB identifier, the second bearer identifier may be at least one of the combination.

It should be further understood that the second bearer identifier may be a bearer identifier of a same type as the first bearer identifier, and the first configuration information includes the first bearer identifier that is the same as the second bearer identifier, or the first configuration information includes the first bearer identifier corresponding to the second bearer identifier. Alternatively, the second bearer identifier is a bearer identifier of a type different from that of the first bearer identifier, but a mapping relationship may exist between the second bearer identifier and the first bearer identifier. This is not limited in this application.

Optionally, the terminal device may separately obtain the second bearer identifier. Alternatively, the second bearer identifier is carried in the service data, and the terminal device obtains the second bearer identifier by obtaining the service data.

For example, the second bearer identifier is encapsulated in the service data. Specifically, the second bearer identifier may be encapsulated in packet header information of the service data, or may be encapsulated in a data payload of the service data.

It should be understood that the service data in this embodiment of this application mainly refers to non (non)-IP type service data.

703. The terminal device selects a transmission path for the first service data based on the second bearer identifier and the first configuration information.

Specifically, the terminal device may select a proper transmission path for the first service data from preconfigured transmission paths based on the second bearer identifier and the first configuration information. The first configuration information may include a first bearer identifier that is the same as the second bearer identifier, or the first configuration information may include a first bearer identifier that corresponds to the second bearer identifier. This is not limited in this application.

If the first configuration information may include the first bearer identifier that is the same as the second bearer identifier, the terminal device may use, as the transmission path of the first service data, path configuration information corresponding to the first bearer identifier that is in the first configuration information and that is the same as the second bearer identifier. If the first configuration information includes the first hearer identifier that corresponds to the second bearer identifier, to be specific, the first configuration information does not directly include the first bearer identifier that is the same as the second bearer identifier, but a preconfigured correspondence exists between the first bearer identifier and the second bearer identifier, the terminal device may directly determine, as the transmission path of the first service data, path configuration information corresponding to the first bearer identifier that corresponds to the second bearer identifier.

Optionally, the terminal device may select, at a first protocol layer, the transmission path for the first service data based on the second bearer identifier and the first configuration information. The first protocol layer belongs to an access stratum of the terminal device, is located above a PDCP layer and adjacent to the PDCP layer, and the PDCP layer is located between the first protocol layer and a radio link control (Radio Link Control, RLC) layer.

Specifically, the first protocol layer is located at access stratums in a control plane protocol stack and a user plane protocol stack, is located above the PDCP layer, and is adjacent to the PDCP layer. The PDCP layer is located between the first protocol layer and the RLC layer. For example, the first protocol layer may be the SDAP layer in the access stratum in FIG. 6. The first configuration information includes at least one first bearer identifier and a transmission path corresponding to each of the at least one first bearer identifier. Specifically, the transmission path may be any one of the sidelink transmission path, the network device forwarding transmission path, the sidelink transmission path and the network device forwarding transmission path, or the sidelink transmission path or the network device forwarding transmission path. After receiving the first service data and the second bearer identifier corresponding to the first service data, the terminal device may select, at the first protocol layer, the transmission path of the first service data based on the first configuration information and the second bearer identifier. In other words, the path selection operation is performed at the access stratum, and based on the bearer identifier of the service data and the first configuration information of the transmission path. In this case, dynamic switching of the terminal device between different transmission paths is transparent to an upper layer, and problems such as a large potential latency and service interruption introduced due to different transmission path mechanisms when transmission path switching is performed are avoided.

Optionally, when the second bearer identifier is the first bearer identifier, in other words, when the second bearer identifier is the same as the first bearer identifier, or the second bearer identifier corresponds to the first bearer identifier, the terminal device may select the transmission path based on the path configuration information corresponding to the first bearer identifier.

It should be understood that, that the second bearer identifier is the same as the first bearer identifier may be that a number, a value, or the like of the second bearer identifier is the same as that of the first bearer identifier. This is not limited in this application.

Optionally, when the second bearer identifier is the first bearer identifier and the path configuration information includes the first indication information, the terminal device selects the sidelink transmission path as the transmission path; when the second bearer identifier is the first bearer identifier and the path configuration information includes the second indication information, the terminal device selects the network device forwarding transmission path as the transmission path; when the second bearer identifier is the first bearer identifier and the path configuration information includes the third indication information, the terminal device selects the sidelink transmission path and the network device forwarding transmission path as the transmission path; and when the second bearer identifier is the first bearer identifier and the path configuration information includes the fourth indication information, the terminal device selects the sidelink transmission path or the network device forwarding transmission path as the transmission path. For example, the path configuration information corresponding to the first bearer identifier included in the first configuration information is at least one of the first indication information, the second indication information, the third indication information, and the fourth indication information, and the second bearer identifier is any one of the four pieces of indication information included in the first configuration information.

Optionally, the path configuration information includes at least one of fifth indication information or sixth indication information. The fifth indication information is any one of a sidelink bearer identifier, a service type identifier, a service identifier, or a first logical channel identifier; and the sixth indication information is a data radio bearer identifier or a second logical channel identifier. That the terminal device selects the transmission path for the first service data based on the first bearer identifier, the second bearer identifier, and the path configuration information includes at least one of the following manners: When the second bearer identifier is the first bearer identifier and the path configuration information includes the fifth indication information, the terminal device selects, based on the fifth indication information, a corresponding sidelink transmission path as the transmission path; and when the second bearer identifier is the first bearer identifier and the path configuration information includes the sixth indication information, the terminal device selects, based on the sixth indication information, a corresponding network device forwarding transmission path as the transmission path.

Specifically, the fifth indication information is an identifier used to indicate the sidelink transmission path, and the sixth indication information is an identifier used to indicate the network device forwarding transmission path. In other words, if the path configuration information includes the fifth indication information, the transmission path selected by the terminal device is the sidelink transmission path; if the path configuration information includes the sixth indication information, the transmission path selected by the terminal device is the network device forwarding transmission path.

The sidelink transmission path or the network device forwarding transmission path may be further specifically divided. The fifth indication information may be any one of the sidelink bearer identifier, the service type identifier, the service identifier, or the first logical channel identifier, and any fifth indication information corresponds to a sidelink transmission path. The sixth indication information may be the data radio bearer identifier or the second logical channel identifier, and the data radio bearer identifier or the second logical channel identifier each corresponds to a network device forwarding transmission path. In this case, the terminal device may select a more proper corresponding transmission path for the first service data based on the second bearer identifier, the first bearer identifier, and the fifth indication information or the sixth indication information in the path configuration information, thereby improving efficiency of data transmission.

For example, when the fifth indication information is the service type identifier, and different service type identifiers correspond to different sidelink transmission paths, the terminal device selects a more proper sidelink transmission path based on the second bearer identifier, the first bearer identifier, and the service type identifier.

When the sixth indication information is the second logical channel identifier, and different second logical channel identifiers correspond to different network device forwarding transmission paths, the terminal device selects a more proper network device forwarding transmission path based on the second bearer identifier, the first bearer identifier, and the second logical channel identifier.

704. The terminal device transmits the first service data on the transmission path. Specifically, if the terminal device transmits the first service data through the Uu air interface, the network device establishes, for the terminal device based on the second bearer identifier, a corresponding evolved packet system (Evolved Packet System, EPS) bearer between the terminal device and a packet data network gateway (Packet Data Network GateWay, PDN P-GW). Further, the terminal device transmits the corresponding service data through the Lu air interface by using the EPS bearer. If the transmission path selected by the terminal device is transmitting the first service data through the Uu air interface, correspondingly, the network device may receive the first service data.

If the terminal device transmits the first service data through the PC5 air interface, the terminal device establishes a corresponding SLRB based on the second bearer identifier, and transmits the first service data through the PC5 air interface. If the transmission path selected by the terminal device is transmitting the first service data through the PC5 air interface, correspondingly, another terminal device may receive the first service data.

Optionally, in an embodiment, when the transmission path includes the sidelink transmission path, in other words, the transmission path of the first service data is any one of the sidelink transmission path or the network device forwarding transmission path, the sidelink transmission path and the network device forwarding transmission path, and the sidelink transmission path, the terminal device may generate a MAC protocol data unit by using the service data, and transmit the MAC protocol data unit through the PC5 air interface.

Figure 9:
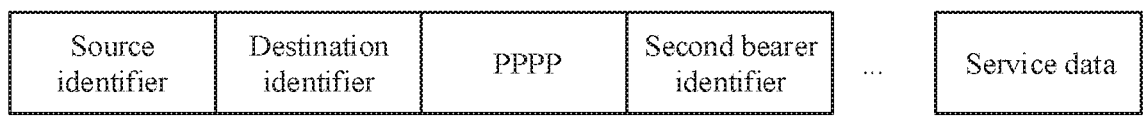
FIG. 9 is a schematic diagram of a media access control (Media Access Control, MAC) frame structure according to an embodiment of this application.

Specifically, the first service data and the first parameter information may be used as content of the MAC protocol data unit and encapsulated in the MAC protocol data unit. As shown in FIG. 9, the first parameter information may include at least one of a source identifier (Source ID), a destination identifier (Destination ID), or priority information (PPPP). The source ID uniquely identifies a communication source end on an air interface, and may change periodically or non-periodically. The destination ID is used to identify different V2X service types of a quality of service requirement. The PPPP identifies different transmission priorities and is mapped to a corresponding logical channel.

For example, if the first parameter information includes the source ID and the destination ID, the terminal device encapsulates the first service data, the source ID, and the destination ID in the MAC protocol data unit, and sends the MAC protocol data unit to another terminal device (represented as a second terminal device). In this case, the second terminal device can learn of the communication source end based on the MAC protocol data unit, and learn of a V2X service type of the quality of service requirement.

For another example, if the first parameter information includes the source ID, the destination ID, and the PPPP, the terminal device encapsulates the first service data, the source ID, the destination ID, and the PPPP in the MAC protocol data unit, and sends the MAC protocol data unit to a second terminal device. In this case, the second terminal device can learn of the communication source end based on the MAC protocol data unit, a V2X service type of the quality of service requirement, and priority information for processing the MAC protocol data unit.

It should be understood that the MAC protocol data unit (Protocol Data Unit, PDU) may also include the second bearer identifier corresponding to the first service data. In other words, the second bearer identifier is also encapsulated in the MAC PDU. This is not limited in this application.

Optionally, the source ID may be separately used as a field of the MAC PDU, or may be used as a field of the second bearer identifier.

Figure 10:
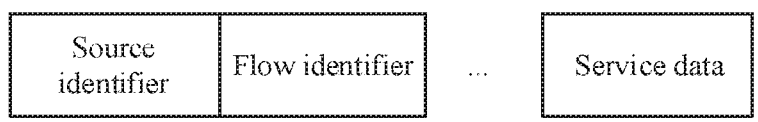
FIG. 10 is a schematic diagram of another MAC frame structure according to an embodiment of this application.
Figure 11:
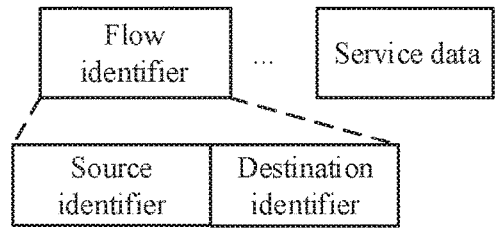
FIG. 11 is a schematic diagram of another MAC frame structure according to an embodiment of this application.

For example, as shown in FIG. 10 and FIG. 11, an example in which the second bearer identifier is the flow identifier is used for representation.

Optionally, in an embodiment, the source ID, the destination ID, and the PPPP in the first parameter information may be obtained from the upper layer.

Optionally, in another embodiment, the terminal device and the network device may preset a mapping relationship between the second bearer identifier and the destination ID and the PPPP. In other words, the destination ID and the PPPP may be separately determined based on the second bearer identifier. In this case, the terminal device may obtain only the source ID, and then determine the destination ID and the PPPP based on the second bearer identifier, to generate the MAC PDU.

Optionally, the source ID obtained by the terminal device may be sent by and received from the upper layer, or may be generated by the access stratum.

It should be understood that the "upper layer" in this embodiment of this application may be an adaptation layer, a non-access stratum, or an application layer above the access stratum. This is not specifically limited herein.

Optionally, the terminal device may separately receive the source ID sent by the upper layer, or may receive the second bearer identifier, where the second bearer identifier carries the source ID.

Optionally, second parameter information may be obtained from the network device, and is in the same configuration information as the second bearer identifier. The second parameter information includes at least one of a second source identifier, a second destination identifier, or second priority information. The second parameter information and the second bearer identifier are represented as second configuration information in the following for ease of description. The terminal device obtains the second configuration information, and selects the transmission path for the first service data based on the second bearer identifier in the second configuration information and the first configuration information. In addition, the terminal device may further generate a second MAC protocol data unit based on the second parameter information and the first service data. The first service data and the second parameter information are encapsulated in the second MAC protocol data unit. In this case, the terminal device may send the second MAC protocol data unit on the selected transmission path.

For example, if the second parameter information includes the source ID and the destination ID, the network device may send the second parameter information to the terminal device. The terminal device encapsulates the first service data, the source ID, and the destination ID in the MAC protocol data unit, and sends the MAC protocol data unit to another terminal device (represented as the second terminal device). In this case, the second terminal device can learn of the communication source end based on the MAC protocol data unit, and learn of a V2X service type of the quality of service requirement.

For another example, if the second parameter information includes the source ID, the destination ID, and the PPPP, the network device may send the second parameter information to the terminal device. The terminal device encapsulates the first service data, the source ID, the destination ID, and the PPPP in the MAC protocol data unit, and sends the MAC protocol data unit to the second terminal device. In this case, the second terminal device can learn of, based on the MAC protocol data unit, the communication source end, a V2X service type of the quality of service requirement, and priority information for processing the MAC protocol data unit.

Optionally, the terminal device may also generate a third MAC protocol data unit based on the second bearer identifier and the first service data, where the second bearer identifier and the first service data are encapsulated in the third MAC protocol data unit, and send the third MAC protocol data unit on the selected transmission path.

Optionally, the second bearer identifier may have a mapping relationship with at least one of the source identifier, the destination identifier, or the second priority information. In this case, the terminal device may learn of based on the second bearer identifier, parameter information required for generating the third MAC protocol data unit, and further generate the third MAC protocol data unit.

Therefore, in the data transmission method in this embodiment of this application, the first service data and the second bearer identifier corresponding to the first service data are obtained, and the first configuration information is obtained. The first configuration information includes at least the first bearer identifier and the path configuration information corresponding to the first bearer identifier, and the path configuration information includes at least one of the sidelink transmission path and the network device forwarding transmission path. In addition, the transmission path is selected for the first service data based on the first configuration information and the second bearer identifier, and further the first service data is transmitted on the selected transmission path. In this case, the terminal device may select a proper transmission path for the first service data based on a pre-established transmission path, to avoid that the transmission path is established only when needed, thereby effectively reducing a potential latency and avoiding service interruption.

Figure 12:
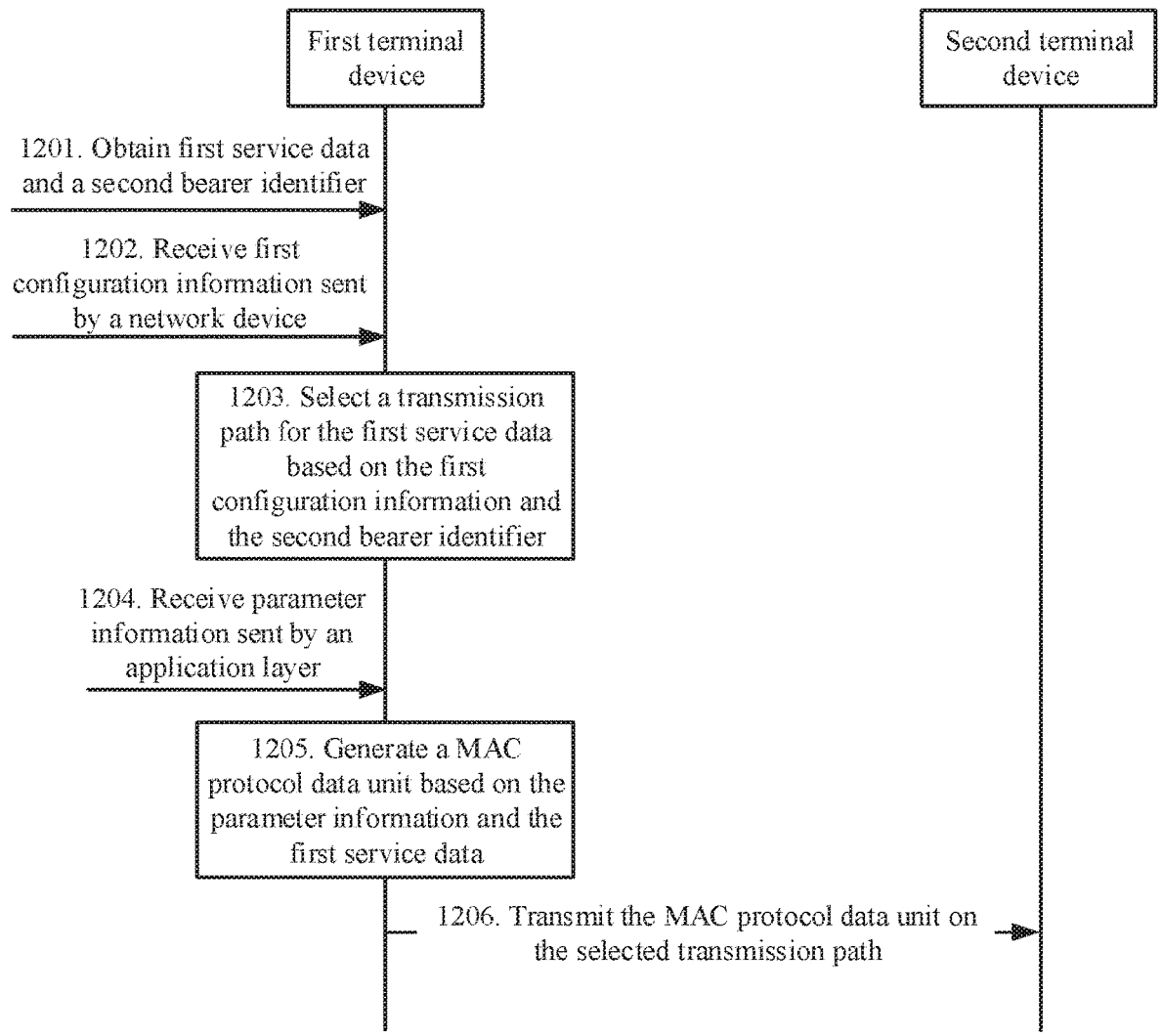
FIG. 12 is a schematic flowchart of a data transmission method according to a specific embodiment of this application.

FIG. 12 is a schematic flowchart of a data transmission method according to a specific embodiment of this application.

1201. A terminal device obtains first service data and a second bearer identifier corresponding to the first service data.

It should be understood that terminal device may be a first terminal device in FIG. 12.

1202. The terminal device receives first configuration information sent by a network device, where the first configuration information includes at least one first bearer identifier and path configuration information corresponding to each first bearer identifier, and the path configuration information includes at least one of a sidelink transmission path and a network device forwarding transmission path.

It should be understood that a sequence of step 1201 and step 1202 is not limited in this application.

1203. The terminal device selects a transmission path for the first service data based on the first configuration information and the second bearer identifier.

1204. The terminal device receives parameter information sent by an application layer.

Optionally, the parameter information may include a source ID, a destination ID, and PPPP.

Optionally, the parameter information may include only a source ID. A mapping relationship exists between a destination ID and the second bearer identifier and between PPPP and the second bearer identifier. In other words, the terminal device may determine the destination ID and the PPPP based on the second bearer identifier.

Optionally, the source ID may be separately obtained, or may be carried in the second bearer identifier.

1205. The terminal device generates a MAC protocol data unit based on the parameter information and the service data.

The terminal device generates the MAC protocol data unit based on the source ID, the destination ID, the PPPP, and the service data.

1206. The terminal device transmits the MAC protocol data unit on the selected transmission path.

It should be understood that the transmission path of the service data does not include the network device forwarding transmission path. Therefore, the terminal device may directly send the MAC protocol data unit to another terminal device (that is, a second terminal device in FIG. 12).

Therefore, in the data transmission method in this embodiment of this application, the terminal device obtains the first service data and the second bearer identifier corresponding to the first service data, and obtains the first configuration information. The first configuration information includes at least the first bearer identifier and the path configuration information corresponding to the first bearer identifier, and the path configuration information includes at least one of the sidelink transmission path and the network device forwarding transmission path. In addition, the terminal device selects the transmission path for the first service data based on the first configuration information and the second bearer identifier. In addition, the terminal device may further receive the parameter information sent by an upper layer, generates the MAC protocol data unit based on the parameter information and the first service data, and further transmits the first service data on the selected transmission path. In this case, the terminal device may select a proper transmission path for the first service data based on a pre-established transmission path, to avoid that a transmission path is established only when needed, thereby effectively reducing a potential latency and improving reliability, and also avoiding service interruption.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

The foregoing describes in detail the data transmission method according to the embodiments of this application with reference to FIG. 7 to FIG. 12. The following describes a terminal device and a network device according to the embodiments of this application with reference to FIG. 13 and FIG. 14.

Figure 13:
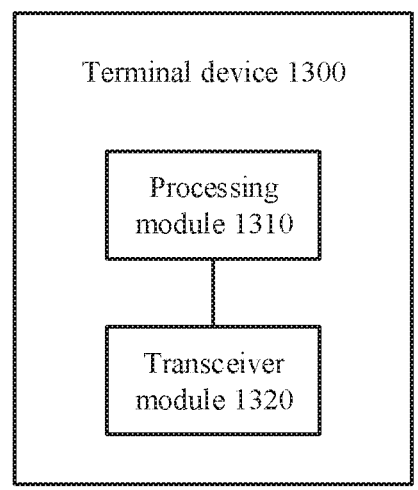
FIG. 13 is a schematic block diagram of a terminal device according to an embodiment of this application.

FIG. 13 is a schematic block diagram of a terminal device 1300 according to an embodiment of this application. As shown in FIG. 13, the terminal device 1300 includes:

a processing module 1310, configured to obtain first configuration information, where the first configuration information includes at least one first bearer identifier and path configuration information corresponding to the first bearer identifier, and the path configuration information corresponding to the first bearer identifier includes at least one of a sidelink transmission path and a network device forwarding transmission path, where the processing module 1310 is further configured to obtain first service data and a second bearer identifier corresponding to the first service data; and the processing module 1310 is further configured to select a transmission path for the first service data based on the first bearer identifier, the second bearer identifier, and the path configuration information; and a transceiver module 1320, configured to transmit the first service data on the transmission path.

Optionally, the processing module 1310 is specifically configured to:

select the transmission path for the first service data at a first protocol layer based on the first bearer identifier, the second bearer identifier, and the path configuration information.

Optionally, the first protocol layer of the terminal device is located above a packet data convergence protocol PDCP layer.

Optionally, the first bearer identifier is at least one of a flow identifier, a sidelink bearer identifier, an evolved radio access bearer E-RAB identifier, or a service type identifier; and the second bearer identifier is at least one of a flow identifier, a sidelink bearer identifier, an evolved radio access bearer E-RAB identifier, or a service type identifier.

Optionally, the processing module 1310 is specifically configured to: when the second bearer identifier is the first bearer identifier, select the transmission path for the first service data based on the path configuration information.

Optionally, the path configuration information includes at least one of first indication information, second indication information, third indication information, or fourth indication information, where the first indication information is used to indicate that the transmission path is a sidelink transmission path, the second indication information is used to indicate that the transmission path is a network device forwarding transmission path, the third indication information is used to indicate that the transmission path is a sidelink transmission path and a network device forwarding transmission path, and the fourth indication information is used to indicate that the transmission path is a sidelink transmission path or a network device forwarding transmission path.

Optionally, the processing module 1310 is specifically configured to:

when the second bearer identifier is the first bearer identifier and the path configuration information includes the first indication information, select the sidelink transmission path as the transmission path;

when the second bearer identifier is the first bearer identifier and the path configuration information includes the second indication information, select the network device forwarding transmission path as the transmission path;

when the second bearer identifier is the first bearer identifier and the path configuration information includes the third indication information, select the sidelink transmission path and the network device forwarding transmission path as the transmission path; and when the second bearer identifier is the first bearer identifier and the path configuration information includes the fourth indication information, select the sidelink transmission path or the network device forwarding transmission path as the transmission path.

Optionally, the path configuration information includes at least one of fifth indication information or sixth indication information, where the fifth indication information is any one of a sidelink bearer identifier, a service type identifier, a service identifier, or a first logical channel identifier, and the sixth indication information is a data radio bearer identifier or a second logical channel identifier; and the processing module 1310 is specifically configured to:

when the second bearer identifier is the first bearer identifier and the path configuration information includes the fifth indication information, select a corresponding sidelink transmission path as the transmission path based on the fifth indication information; or when the second bearer identifier is the first bearer identifier and the path configuration information includes the sixth indication information, select a corresponding network device forwarding transmission path as the transmission path based on the sixth indication information.

Optionally, when the transmission path includes the sidelink transmission path, the processing module 1310 is further configured to obtain first parameter information, where the first parameter information includes at least one of a first source identifier, a first destination identifier, or first priority information.

The processing module 1310 is further configured to generate a first media access control MAC protocol data unit based on the first parameter information and the first service data, where the first service data and the first parameter information are encapsulated in the first MAC protocol data unit.

The transceiver module 1320 is further configured to send the first MAC protocol data unit on the transmission path.

Optionally, the processing module 1310 is further configured to:

obtain second configuration information, where the second configuration information includes the second bearer identifier and second parameter information, and the second parameter information includes at least one of a second source identifier, a second destination identifier, or second priority information; and when the second bearer identifier is the first bearer identifier, generate a second MAC protocol data unit based on the second parameter information and the first service data, where the first service data and the second parameter information are encapsulated in the second MAC protocol data unit.

The transceiver module 1320 is further configured to send the second MAC protocol data unit on the transmission path.

Optionally, the processing module 1310 is further configured to generate a third MAC protocol data unit based on the second bearer identifier and the first service data, where the second bearer identifier and the first service data are encapsulated in the third MAC protocol data unit.

The transceiver module 1320 is specifically configured to:

send the third MAC protocol data unit on the transmission path.

Optionally, the processing module 1310 is further configured to obtain preconfiguration information, where the preconfiguration information includes the first configuration information; or the processing module 1310 is further configured to receive a system message sent by a network device, where the system message carries the first configuration information; or the processing module 1310 is further configured to receive dedicated radio resource control signaling sent by a network device, where the dedicated radio resource control signaling carries the first configuration information.

Therefore, the terminal device in this embodiment of this application obtains the first service data and the second bearer identifier corresponding to the first service data, and obtains the first configuration information. The first configuration information includes at least the first bearer identifier and the path configuration information corresponding to the first bearer identifier, and the path configuration information includes at least one of the sidelink transmission path and the network device forwarding transmission path. In addition, the terminal device selects the transmission path for the first service data based on the first configuration information and the second bearer identifier. In addition, the terminal device may further receive the parameter information sent by an upper layer, generates the MAC protocol data unit based on the parameter information and the first service data, and further transmits the first service data on the selected transmission path. In this case, the terminal device may select a proper transmission path for the first service data based on a pre-established transmission path, to avoid that a transmission path is established only when needed, thereby effectively reducing a potential latency and improving reliability, and also avoiding service interruption.

It should be understood that, the terminal device 1300 according to this embodiment of this application may correspond to the terminal device in the data transmission method in the embodiments of this application, and the foregoing management operations and/or functions and other management operations and/or functions of the modules of the terminal device 1300 are intended to implement corresponding steps of the foregoing methods. For brevity, details are not described herein again.

Figure 14:
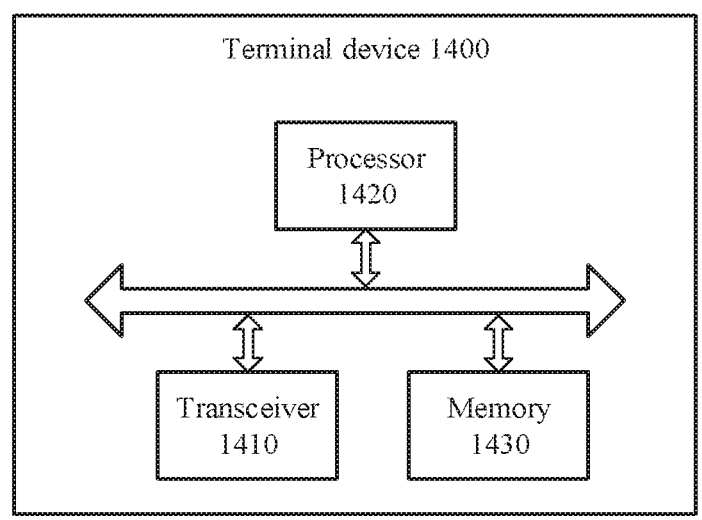
FIG. 14 is a schematic structural diagram of a terminal device according to an embodiment of this application.

The transceiver module 1320 in this embodiment of this application may be implemented by using a transceiver, and the processing module 1310 may be implemented by using a processor. As shown in FIG. 14, a terminal device 1400 may include a transceiver 1410, a processor 1420, and a memory 1430. The memory 1430 may be configured to store indication information, and may further be configured to store code, an instruction, and the like that are executed by the processor 1420.

Figure 15:
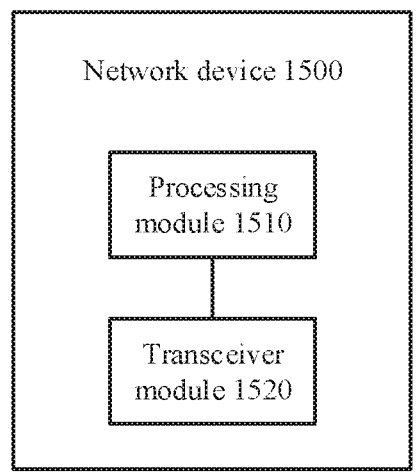
FIG. 15 is a schematic block diagram of a network device according to an embodiment of this application.

FIG. 15 is a schematic block diagram of a network device 1500 according to an embodiment of this application. As shown in FIG. 15, the network device 1500 includes:

a processing module 1510, configured to determine first configuration information, where the first configuration information includes at least one first bearer identifier and path configuration information corresponding to the first bearer identifier, and the path configuration information corresponding to the first bearer identifier includes at least one of a sidelink transmission path and a network device forwarding transmission path; and a transceiver module 1520, configured to send the first configuration information to a terminal device, where the first configuration information is a reference element used by the terminal device to select a transmission path for first service data.

Optionally, the processing module is specifically configured to determine the first configuration information at a non-access stratum.

Optionally, the first hearer identifier is at least one of a flow identifier, a sidelink bearer identifier, an E-RAB identifier, or a service type identifier.

Optionally, the path configuration information includes at least one of first indication information, second indication information, third indication information, or fourth indication information, where the first indication information is used to indicate that the transmission path is a sidelink transmission path, the second indication information is used to indicate that the transmission path is a network device forwarding transmission path, the third indication information is used to indicate that the transmission path is a sidelink transmission path and a network device forwarding transmission path, and the fourth indication information is used to indicate that the transmission path is a sidelink transmission path or a network device forwarding transmission path.

Optionally, when the transmission path includes the network device forwarding transmission path, the transceiver module 1520 is further configured to receive the first service data.

Optionally, when the transmission path of the service data includes the sidelink transmission path, the transceiver module 1520 is further configured to receive a first media access control MAC protocol data unit, where the first MAC protocol data unit is generated by the terminal device based on first parameter information and the first service data, the first parameter information includes at least one of a first source identifier, a first destination identifier, or first priority information, and the first service data and the first parameter information are encapsulated in the first MAC protocol data unit.

Optionally, the transceiver module 1520 is further configured to:

send second configuration information, where the second configuration information includes the second bearer identifier and second parameter information, and the second parameter information includes at least one of a second source identifier, a second destination identifier, or second priority information; and receive a second MAC protocol data unit, where the second MAC protocol data unit is generated by the terminal device based on the second parameter information and the first service data, and the first service data and the second parameter information are encapsulated in the second MAC protocol data unit.

Optionally, the transceiver module 1520 is specifically configured to:

receive a third MAC protocol data unit, where the third MAC protocol data unit is generated by the terminal device based on the second bearer identifier and the first service data, and the second bearer identifier and the first service data are encapsulated in the third MAC protocol data unit.

Optionally, the transceiver module 1520 is specifically configured to:

send preconfiguration information to the terminal device, where the preconfiguration information includes the first configuration information; or send a system message to the terminal device, where the system message carries the first configuration information; or send dedicated radio resource control signaling to the terminal device, where the dedicated radio resource control signaling carries the first configuration information.

Therefore, the network device in this embodiment of this application determines the first configuration information. The first configuration information includes at least the first bearer identifier and the path configuration information corresponding to the first bearer identifier, and the path configuration information includes at least one of the sidelink transmission path and the network device forwarding transmission path. In addition, the network device sends the first configuration information to the terminal device, so that the terminal device selects the transmission path for the first service data based on the first configuration information and the second bearer identifier corresponding to the first service data, and further transmits the first service data on the selected transmission path. In this case, the terminal device may select a proper transmission path for the first service data based on a pre-established transmission path, to avoid that a transmission path is established only when needed, thereby effectively reducing a potential latency and improving reliability, and also avoiding service interruption.

It should be understood that, the network device 1500 according to this embodiment of this application may correspond to the network device in the data transmission method in the embodiments of this application, and the foregoing management operations and/or functions and other management operations and/or functions of the modules of the network device 1500 are intended to implement corresponding steps of the foregoing methods. For brevity, details are not described herein again.

Figure 16:
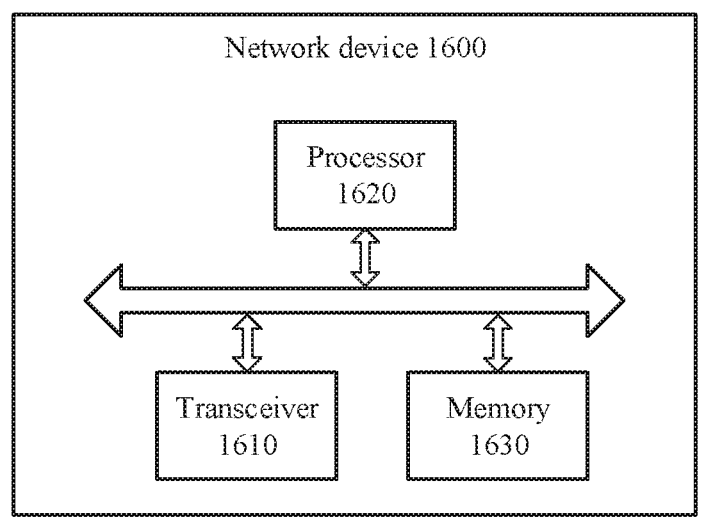
FIG. 16 is a schematic structural diagram of a network device according to an embodiment of this application.

The receive module 1520 in this embodiment of this application may be implemented by using a transceiver, and the processing module 1510 may be implemented by using a processor. As shown in FIG. 16, a network device 1600 may include a transceiver 1610, a processor 1620, and a memory 1630. The memory 1630 may be configured to store indication information, and may further be configured to store code, an instruction, and the like that are executed by the processor 1630.

It should be understood that the processor 1420 or the processor 1620 may be an integrated circuit chip and have a signal processing capability. In an implementation process, steps in the foregoing method embodiments may be implemented by using a hardware integrated logical circuit in the processor, or by using instructions in a form of software. The processor may be a general purpose processor, a digital signal processor (Digital Signal Processor, DSP), an application-specific integrated circuit (Application Specific Integrated Circuit, ASIC), a field programmable gate array (Field Programmable Gate Array, FPGA) or another programmable logical device, a discrete gate or a transistor logic device, or a discrete hardware component. The processor may implement or perform the methods, the steps, and the logical block diagrams that are disclosed in the embodiments of the present invention. The general purpose processor may be a microprocessor, or the processor may be any conventional processor or the like. Steps of the methods disclosed with reference to the embodiments of the present invention may be directly executed and accomplished by using a hardware decoding processor, or may be executed and accomplished by using a combination of hardware and software modules in the decoding processor. A software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that, the memory 1430 or the memory 1630 in the embodiments of the present invention may be a volatile memory or a non-volatile memory, or may include both a volatile memory and a non-volatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), used as an external cache. Through example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchronous link dynamic random access memory (Synchronous Link DRAM, SLDRAM), and a direct rambus dynamic random access memory (Direct Rambus RAM, DR RAM). It should be noted that the memory of the system and methods described in this specification includes but is not limited to these and any memory of another proper type.

Figure 17:
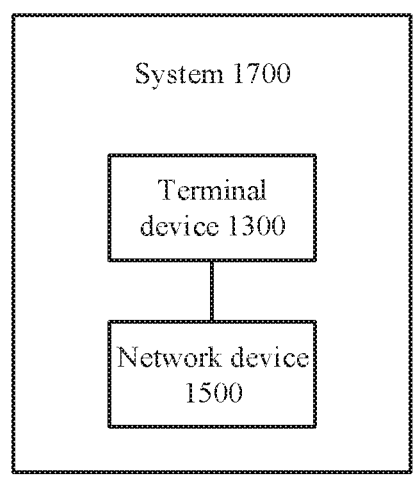
FIG. 17 is a schematic block diagram of a system according to an embodiment of this application.

An embodiment of this application further provides a system. As shown in FIG. 17, the system 1700 includes:

the terminal device 1300 in the foregoing embodiment of this application and the network device 1500 in foregoing embodiment of this application.

An embodiment of this application further provides a computer storage medium, and the computer storage medium may store a program instruction for indicating any of the foregoing methods.

Optionally, the storage medium may specifically be the memory 1430 or 1630.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data transmission method, comprising:
obtaining, by a terminal device, first configuration information, wherein the first configuration information comprises at least one first bearer identifier and path configuration information corresponding to the first bearer identifier,
wherein the path configuration information corresponding to the first bearer identifier comprises at least one of a sidelink transmission path or a network device forwarding transmission path, and
wherein the first bearer identifier is at least one of a flow identifier, a sidelink bearer identifier, an evolved radio access bearer (E-RAB) identifier (ID), or a service type identifier;
obtaining, by the terminal device, first service data and a second bearer identifier corresponding to the first service data, wherein the second bearer identifier is at least one of a flow identifier, a sidelink bearer identifier, an E-RAB ID, or a service type identifier;
selecting, by the terminal device, a transmission path for the first service data based on the first bearer identifier, the second bearer identifier, and the path configuration information; and
transmitting, by the terminal device, the first service data on the transmission path.

2. The method according to claim 1, wherein the selecting, by the terminal device, a transmission path for the first service data based on the first bearer identifier, the second bearer identifier, and the path configuration information comprises:
selecting, by the terminal device and at a first protocol layer, the transmission path for the first service data based on the first bearer identifier, the second bearer identifier, and the path configuration information.

3. The method according to claim 1, wherein the selecting, by the terminal device, a transmission path for the first service data based on the first bearer identifier, the second bearer identifier, and the path configuration information comprises:
when the second bearer identifier is the first bearer identifier, selecting, by the terminal device, the transmission path for the first service data based on the path configuration information.

4. The method according to claim 1, wherein the path configuration information comprises at least one of first indication information, second indication information, third indication information, or fourth indication information, wherein the first indication information is used to indicate that the transmission path is a sidelink transmission path, wherein the second indication information is used to indicate that the transmission path is a network device forwarding transmission path, wherein the third indication information is used to indicate that the transmission path is a sidelink transmission path and a network device forwarding transmission path, and wherein the fourth indication information is used to indicate that the transmission path is a sidelink transmission path or a network device forwarding transmission path.

5. The method according to claim 4, wherein the selecting, by the terminal device, a transmission path for the first service data based on the first bearer identifier, the second bearer identifier, and the path configuration information comprises at least one of the following manners:
when the second bearer identifier is the first bearer identifier and when the path configuration information comprises the first indication information, selecting, by the terminal device, the sidelink transmission path as the transmission path;
when the second bearer identifier is the first bearer identifier and when the path configuration information comprises the second indication information, selecting, by the terminal device, the network device forwarding transmission path as the transmission path;
when the second bearer identifier is the first bearer identifier and when the path configuration information comprises the third indication information, selecting, by the terminal device, the sidelink transmission path and the network device forwarding transmission path as the transmission path; or when the second bearer identifier is the first bearer identifier and when the path configuration information comprises the fourth indication information, selecting, by the terminal device, the sidelink transmission path or the network device forwarding transmission path as the transmission path.

6. The method according to claim 1, wherein the path configuration information comprises at least one of fifth indication information or sixth indication information, wherein the fifth indication information is any one of a sidelink bearer identifier, a service type identifier, a service identifier, or a first logical channel identifier, and wherein the sixth indication information is a data radio bearer identifier or a second logical channel identifier; and wherein the selecting, by the terminal device, a transmission path for the first service data based on the first bearer identifier, the second bearer identifier, and the path configuration information comprises at least one of the following manners:

when the second bearer identifier is the first bearer identifier and when the path configuration information comprises the fifth indication information, selecting, by the terminal device, a corresponding sidelink transmission path as the transmission path based on the fifth indication information; or when the second bearer identifier is the first bearer identifier and when the path configuration information comprises the sixth indication information, selecting, by the terminal device, a corresponding network device forwarding transmission path as the transmission path based on the sixth indication information.

7. The method according to claim 1, wherein when the transmission path comprises the sidelink transmission path, before the selecting, by the terminal device, a transmission path for the first service data based on the first bearer identifier, the second bearer identifier, and the path configuration information, the method further comprises:

obtaining, by the terminal device, first parameter information, wherein the first parameter information comprises at least one of a first source identifier, a first destination identifier, or first priority information; and wherein the transmitting, by the terminal device, the first service data on the transmission path comprises:

generating, by the terminal device, a first media access control (MAC) protocol data unit based on the first parameter information and the first service data, wherein the first service data and the first parameter information are encapsulated in the first MAC protocol data unit; and sending, by the terminal device, the first MAC protocol data unit on the transmission path.

8. The method according to claim 1, wherein before the selecting, by the terminal device, a transmission path for the first service data based on the first bearer identifier, the second bearer identifier, and the path configuration information, the method further comprises:

obtaining, by the terminal device, second configuration information, wherein the second configuration information comprises the second bearer identifier and second parameter information, and wherein the second parameter information comprises at least one of a second source identifier, a second destination identifier, or second priority information; and wherein the transmitting, by the terminal device, the first service data on the transmission path comprises:

when the second bearer identifier is the first bearer identifier, generating, by the terminal device, a second MAC protocol data unit based on the second parameter information and the first service data, wherein the first service data and the second parameter information are encapsulated in the second MAC protocol data unit; and sending, by the terminal device, the second MAC protocol data unit on the transmission path.

9. A data transmission method, comprising:

determining, by a network device, first configuration information, wherein the first configuration information comprises at least one first bearer identifier and path configuration information corresponding to the first bearer identifier, wherein the path configuration information corresponding to the first bearer identifier comprises at least one of a sidelink transmission path and a network device forwarding transmission path, and wherein the first bearer identifier is at least one of a flow identifier, a sidelink bearer identifier, an evolved radio access bearer (E-RAB) identifier (ID), or a service type identifier; and sending, by the network device, the first configuration information to a terminal device, wherein the first configuration information is a reference element used by the terminal device to select a transmission path for first service data.

10. The method according to claim 9, wherein the determining, by a network device, first configuration information comprises:

determining, by the network device, the first configuration information at a non-access stratum.

11. A terminal device, comprising:

at least one processor;

a memory storing instructions executable by the at least one processor, wherein the instructions, when executed by the at least one processor, instruct the at least one processor to:

obtain first configuration information, wherein the first configuration information comprises at least one first bearer identifier and path configuration information corresponding to the first bearer identifier, wherein the path configuration information corresponding to the first bearer identifier comprises at least one of a sidelink transmission path and a network device forwarding transmission path, and wherein the first bearer identifier is at least one of a flow identifier, a sidelink bearer identifier, an evolved radio access bearer (E-RAB) identifier (ID), or a service type identifier;

obtain first service data and a second bearer identifier corresponding to the first service data, wherein the second bearer identifier is at least one of a flow identifier, a sidelink bearer identifier, an E-RAB ID, or a service type identifier; and select a transmission path for the first service data based on the first bearer identifier, the second bearer identifier, and the path configuration information; and a transceiver, configured to transmit the first service data on the transmission path.

12. The terminal device according to claim 11, wherein the instructions further instruct the at least one processor to:

select, at a first protocol layer, the transmission path for the first service data based on the first bearer identifier, the second bearer identifier, and the path configuration information.

13. The terminal device according to claim 11, wherein the instructions further instruct the at least one processor to:
when the second bearer identifier is the first bearer identifier, select the transmission path for the first service data based on the path configuration information.

14. The terminal device according to claim 11, wherein the path configuration information comprises at least one of first indication information, second indication information, third indication information, or fourth indication information, wherein the first indication information is used to indicate that the transmission path is a sidelink transmission path, wherein the second indication information is used to indicate that the transmission path is a network device forwarding transmission path, wherein the third indication information is used to indicate that the transmission path is a sidelink transmission path and a network device forwarding transmission path, and wherein the fourth indication information is used to indicate that the transmission path is a sidelink transmission path or a network device forwarding transmission path.

15. The terminal device according to claim 14, wherein the instructions further instruct the at least one processor to perform at least one of the following steps:
when the second bearer identifier is the first bearer identifier and when the path configuration information comprises the first indication information, select the sidelink transmission path as the transmission path;
when the second bearer identifier is the first bearer identifier and when the path configuration information comprises the second indication information, select the network device forwarding transmission path as the transmission path;
when the second bearer identifier is the first bearer identifier and when the path configuration information comprises the third indication information, select the sidelink transmission path and the network device forwarding transmission path as the transmission path; or
when the second bearer identifier is the first bearer identifier and when the path configuration information comprises the fourth indication information, select the sidelink transmission path or the network device forwarding transmission path as the transmission path.

16. The terminal device according to claim 11, wherein the path configuration information comprises at least one of fifth indication information or sixth indication information, wherein the fifth indication information is any one of a sidelink bearer identifier, a service type identifier, a service identifier, or a first logical channel identifier, and wherein the sixth indication information is a data radio bearer identifier or a second logical channel identifier; and
wherein the instructions further instruct the at least one processor to perform at least one of the following steps:
when the second bearer identifier is the first bearer identifier and when the path configuration information comprises the fifth indication information, select a corresponding sidelink transmission path as the transmission path based on the fifth indication information; or
when the second bearer identifier is the first bearer identifier and when the path configuration information comprises the sixth indication information, select a corresponding network device forwarding transmission path as the transmission path based on the sixth indication information.

17. The terminal device according to claim 11, wherein when the transmission path comprises the sidelink transmission path, the instructions further instruct the at least one processor to:
obtain first parameter information, wherein the first parameter information comprises at least one of a first source identifier, a first destination identifier, or first priority information;
generate a first media access control (MAC) protocol data unit based on the first parameter information and the first service data, wherein the first service data and the first parameter information are encapsulated in the first MAC protocol data unit; and
wherein the transceiver is further configured to send the first MAC protocol data unit on the transmission path.

18. The terminal device according to claim 11, wherein the instructions further instruct the at least one processor to:
obtain second configuration information, wherein the second configuration information comprises the second bearer identifier and second parameter information, and wherein the second parameter information comprises at least one of a second source identifier, a second destination identifier, or second priority information; and
when the second bearer identifier is the first bearer identifier, generate a second MAC protocol data unit based on the second parameter information and the first service data, wherein the first service data and the second parameter information are encapsulated in the second MAC protocol data unit; and
wherein the transceiver is further configured to send the second MAC protocol data unit on the transmission path.

* * * * *

UNITED STATES PATENT AND TRADEMARK OFFICE
CERTIFICATE OF CORRECTION

PATENT NO. : 11,012,886 B2
APPLICATION NO. : 16/698736
DATED : May 18, 2021
INVENTOR(S) : Hejun Wang et al.

Page 1 of 1

It is certified that error appears in the above-identified patent and that said Letters Patent is hereby corrected as shown below:

In the Specification

In Column 1, Line 8, delete "international" and insert -- International --, therefor.

Signed and Sealed this
Tenth Day of August, 2021

Drew Hirshfeld
*Performing the Functions and Duties of the
Under Secretary of Commerce for Intellectual Property and
Director of the United States Patent and Trademark Office*